April 15, 1941.   J. H. REIFENBERG   2,238,600
ELECTRIC WATER HEATER SYSTEM
Filed Sept. 30, 1939
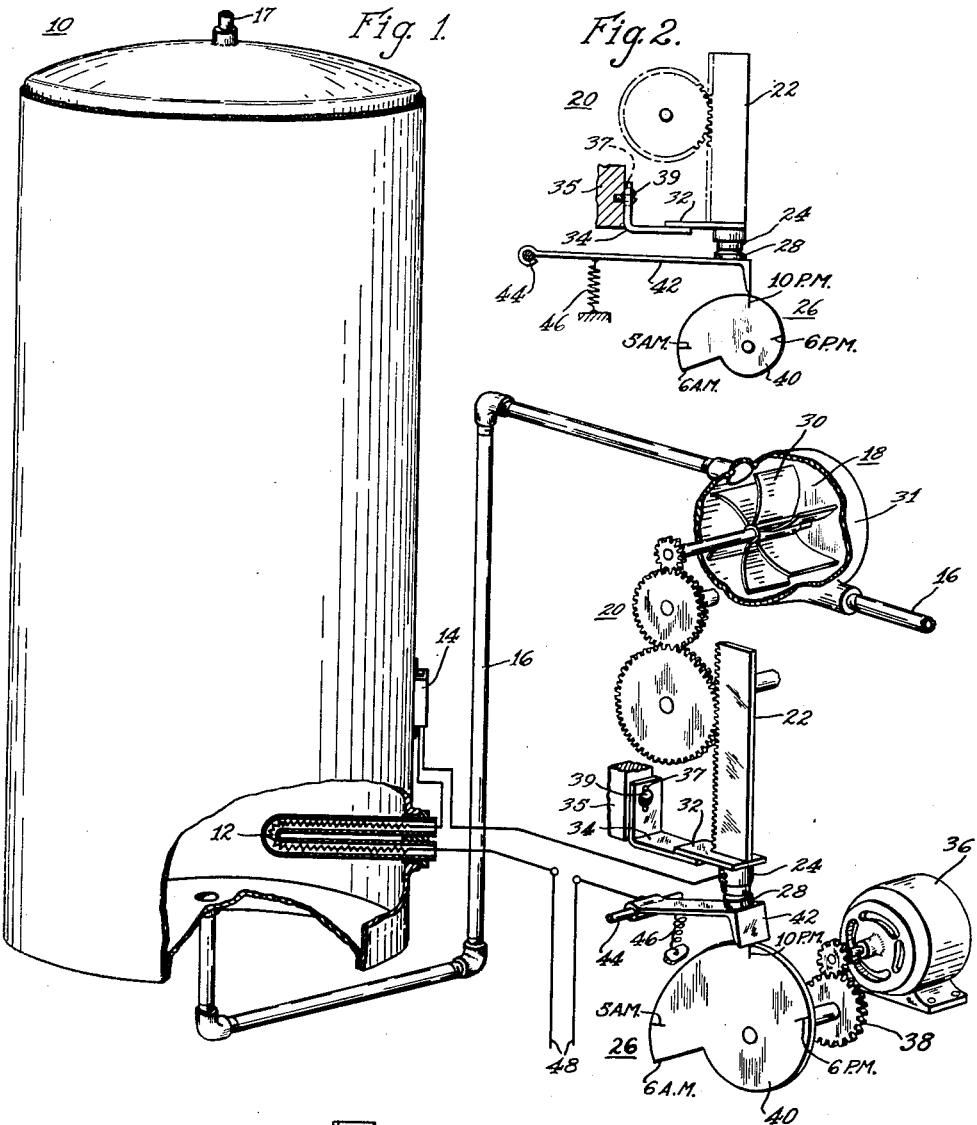
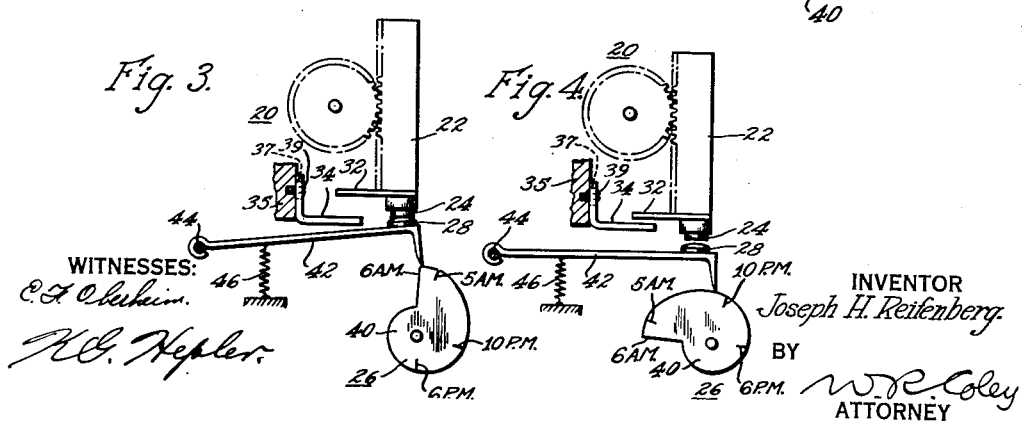
WITNESSES:
C. F. Oberheim.
H. G. Hepler.
INVENTOR
Joseph H. Reifenberg.
BY
W. R. Coley
ATTORNEY Patented Apr. 15, 1941

2,238,600

UNITED STATES PATENT OFFICE 2,238,600

ELECTRIC WATER HEATER SYSTEM

Joseph H. Reifenberg, Mansfield, Ohio, assignor to Westinghouse Electric & Manufacturing Company, East Pittsburgh, Pa., a corporation of Pennsylvania Application September 30, 1939, Serial No. 297,293

7 Claims. (Cl. 219—39)

My invention relates to water heaters, and the like, and more particularly to a water heating control system.

An object of my invention is to provide a fluid or water heating control system which includes means responsive to the fluid or water usage for regulating the operation of the fluid or water heater.

Another object of my invention is to provide a fluid heating system which includes means responsive to the fluid used and cooperative means responsive to the passage of time for rendering the heat-imparting means effective at a predetermined time in response to the quantity of fluid used and the time of the day.

Still a further object of my invention is to provide an off-peak water heater controlling device which will connect the water heater to a power supply in accordance with the water heater heating requirements and the quantity of water used, so that the heating of the water will take place during the last hours of the off-peak period in direct proportion to the amount of replacing heat required to bring the tank temperature back to its predetermined maximum value at the end of the off-peak period, instead of during the first hours of such off-peak period, as is done in the conventional systems now known to the art.

Other objects of my invention will either be pointed out specifically in the course of the following description of a device embodying my invention, or will be apparent from such description.

In the accompanying figures,

Figure 1 is a diagrammatic perspective view illustrating a control system embodying my invention, and Figs. 2, 3 and 4 are views illustrating the various operative positions of a portion of such control system.

Referring to the accompanying drawing, in which like reference characters represent like parts in the various figures, I show a fluid heating control system including a fluid container 10, a heating element 12 located therein, a thermostat 14 adapted to control the element 12 in a well known manner, an inlet pipe 16, an outlet pipe 17, a flow meter operatively associated with inlet pipe 16 and adapted to operate a suitable gear train 20 and a movable rack 22 having a movable contact 24 mounted thereon, a time-of-day mechanism 26, and a second contact 28 operatively associated therewith and with the first contact 24 for controlling the operation of the heating element 12.

The flow meter 18 comprises, in this instance, a suitable propeller type actuator 30 positioned within a housing 31 and adapted to rotate in response to the passage of fluid through the inlet pipe 16. It is to be understood that the quantity of fluid or water passing through the inlet pipe 16 is substantially equal to the amount of hot water withdrawn from the container through outlet pipe 17, and that the flow of water into the container occurs simultaneously with the withdrawal of such heated fluid. The propeller 30 rotates a given number of revolutions for a given quantity of fluid passing through the inlet pipe. Such propeller and flow meter 18 are thus adapted to respond to the volume of fluid or water admitted to and withdrawn from the tank 10.

The suitable gear train 20 operatively associated with the propeller 30 is adapted to transmit the rotative movements thereof to the operatively associated rack 22. Such gear train comprises, in this instance, a plurality of intermeshed gears which are adapted to be rotated by the propeller actuator 30. However, such gears are operatively associated with the actuator 30 through a suitable clutch mechanism (not shown) which, when the gears are held in one of their limiting positions through their cooperation with rack 22, permits the actuator to rotate without moving the gears. In addition, the clutch mechanism (not shown) permits the rack 22 to be moved upwardly against the rotative movements of the actuator without impairing its movements.

The rack structure 22, directly associated with the gear train 20 comprises, in this instance, a vertically extending bar-like member having teeth on one edge thereof, a travel limiting flange 32 located at the bottom thereof, and the movable contact 24 insulatedly attached to the lower surface of the flange 32. The rack 22 is, in this instance, adapted to move in a vertical direction in response to the rotative movements of the gear train 20. Accordingly, as fluid or water passes through the inlet pipe 16 and the container 10, the flow meter 18 will cause the gear train 20 to function and the rack 22 to be lowered a given distance for a given quantity of fluid passing through the system. It, therefore, follows that the vertical position of rack 22 will be proportionate to the quantity of fluid removed from the tank 10.

The quantity-actuated contact 24 is rigidly attached to the lower portion of the rack 22, as hereinabove described, and is adapted to cooperate with the time responsive contact 28 in the manner hereinafter described. A suitable shoulder or travel limiting flange 32 is functionally integral with the rack 22 and is adapted to cooperate with an adjustable stationary ledge 34 so as to limit the downward vertical movement of the rack and quantity-actuated contact 24. The adjustable stationary ledge 34 is, in this instance, an L-shaped member movably attached to a rigid support 35. A vertically extending slot 37 is positioned within the member 34 through which a screw 39 is passed to rigidly attach the ledge member 34 to the support. In addition, the screw permits the ledge member 34 to be adjusted to any desired vertical position for selectively limiting the downward travel of rack 22 and movable quantity-actuated contact 24.

The time-of-day mechanism 26 comprises, in this instance, a motor or actuating device 36, gear train 38, and a substantially involute cam 40. The motor 36 is, in this instance, a constant speed motor and is operatively associated with a suitable power supply (not shown). However, it is obvious the motor 36 may be replaced by any other suitable constant speed driving mechanism. The motor or actuating device 36 is directly associated with a suitable gear train 38 which, in turn, is adapted to reduce the rotative velocity of the involute cam 40 to subtsantially one revolution every 24 hours. It is to be understood that the time-of-day mechanism 26, hereinabove described, is merely used for illustrative purposes and that any other suitable constant speed driving mechanism may be used in lieu thereof.

The involute cam 40 is, in this instance, formed from a single sheet of material and is directly associated with the gear train so as to rotate in response to the movements of the actuating motor 36. The configuration of the cam 40 is in the form of a regular involute except that a portion of the largest radius section of the cam has a uniform radius, as hereinafter described. The involute cam 40 is, in addition to cooperating with the timing device 36, adapted to cooperate with the time-responsive contact 28 so as to cause such contact to cooperatively engage the quantity-actuated contact 24 for predetermined periods of time at preselected times of the day.

The time-responsive contact 28 is, in this instance, insulatedly and rigidly attached to a suitable downwardly biased rotatably mounted arm 42. The arm 42 is, in this instance, substantially an inverted L-shaped member and is rotatably mounted on a suitable supporting pin or structure 44. The arm 42 is biased downwardly by a suitable resilient member 46 and due to such downward biasing action, is adapted to ride upon, and to be guided in its movements by the involute cam 40. Accordingly, it follows that the time-responsive contact 28, rigidly attached to the free end of the arm 42, will be moved vertically in response to the passage of time.

It will be understood that suitable supports or mountings (not shown) will be provided for the illustrated parts, but since such supports or mountings may be readily supplied without requiring invention, it has not been deemed necessary to illustrate them here.

The cam 40 is positioned with respect to the actuating motor 36 and gear train 38 so that the arm 42 resting thereon will normally engage the cam at a point corresponding to the greatest radius, or at a point just prior to the shortest radius, at, in this instance, 6 A. M. (see Fig. 3) even though no fluid has been withdrawn from the container 10. It, therefore, follows that at 6 A. M. the arm 42 and the insulated attached contact 28 will be in substantially their uppermost position. However, immediately thereafter such shortest radius of the cam becomes effective and the arm 42 and contact 28 will occupy substantially their lowermost position. The contact 28 and arm 42 will then be slowly raised in response to the configuration of cam 40, from its lowest or shortest-radius point to the uppermost or greatest-radius point in response to the passage of time so as to become operatively associated with the quantity-actuated contact 24, in response to the passage of time and the quantity of fluid passing through the system.

At 10 P. M., for example, the cam 40 will be located so that the cooperating arm 42 will be raised to a point where the time-actuated contact 28 will contact the quantity-actuated contact 24 provided that the quantity-contact 24 is in its lowermost position (see Fig. 2). Should the quantity-contact not be in its lowermost position at 10 P. M. (see Fig. 1) it follows that the cam will continue to rotate and raise the time contact 28 with the passage of time whereupon the two contacts may become engaged at, say, about 12 P. M. (see Fig. 4). It will, therefore, be understood that the time the two contacts 24 and 28 are adapted to meet depends upon the quantity of fluid flowing through the system as well as the passage of time.

It is to be further understood that the configuration of involute cam 40 may be selected or designed to achieve desired results. For example, the radius or slope of such cam may be constant for a given distance prior to the cut-off time, say, between 5 A. M. and 6 A. M. This will permit the contact 28 to be forced into engagement with the contact 24 for a corresponding period of time, even though no water or fluid had been withdrawn from the tank. This permits the heating element 12 to be engaged for a corresponding period of time to recover the normal heat losses from the tank.

When operating the fluid heating control system embodying my invention with the heating element 12 and cooperating contacts 24 and 28 operatively associated with a suitable supply circuit 48, it follows that as fluid is withdrawn from the tank 10 through outlet pipe 17, the flow meter 18 will be actuated by the corresponding flow through inlet pipe 16, whereby the rack 22 and the quantity-actuated contact 24 will be slowly lowered in direct proportion to the quantity of fluid withdrawn from the tank. Assuming that the cooperating contacts 24 and 28 are disengaged, it follows that the heating element will likewise be disconnected from the supply circuit 48. However, with a continued withdrawal of fluid from the tank 10, the rack 22 and contact 24 will be continually moved downwardly. Should the quantity of fluid removed from the tank be of such a magnitude that the rack 22 would be moved to its lowest point, it follows that flange 32 will engage the adjustable platform or ledge 34 so as to limit the movements of such rack and quantity-actuated contact 24 (see Fig. 2). It is to be understood that the ledge 34 may be, if desired, adjustable so that limiting position of the contact 24 may be adjusted to any desired position. This, in turn, changes the earliest time at which the cooperative contacts 24 and 28 may become engaged. The time of engagement is advanced or becomes earlier when ledge 34 is lowered and becomes later when the stop is raised. It follows that the heating element 12 must be of such value or rating for each desired setting of ledge 34 as to recuperate the loss in temperature in the tank, due to withdrawal of hot fluid from the tank, by the cut-off time.

Assuming that the time-of-day is slightly later than 6 A. M., it follows that the involute cam is located in such a position that the downwardly biased arm 42 and time-responsive contact 24 are in substantially their lowermost position. The cooperative contacts 24 and 28 thus have been disengaged. However, assuming that the rack 22 is in its lowermost position with the involute cam rotated to substantially a 10 P. M. position, it follows that the cooperating contacts 24 and 28 will be engaged, permitting the heating element 12 to be connected or energized (see Fig. 2). Such action permits the fluid in tank 10 to be increased in temperature. With the passage of time and the slow rotation of the involute cam 40, such cam will force the arm 42 upwardly. The upward movement of arm 42 and contact 28, in turn, force the quantity-actuated contact 24 (engaged with contact 28) and rack 22 upwardly. It will be understood that a suitable clutch (not shown) may be provided which, when open, permits the rack 22 to be backed or returned upwardly to an initial or high position without impairing the rotation of actuator 30.

It is, therefore, obvious that as fluid is removed from the tank the quantity-actuated contact 24 will be lowered a proportionate amount so as to be in a cooperative position with the time-actuated contact 28 and that the time-actuated contact 28 will be raised a proportional amount with the passage of time so as to engage the contact 24 at a preselected time depending upon the quantity of fluid withdrawn and the time of day. Further, the involute cam 40 will force the contact 24 and rack 22 upwardly to their original position while simultaneously permitting the heating element 12 to be energized whereby the tank may be reheated to its desired temperature value.

The length of time of the cooperative engagement of the contacts 24 and 28 will be of such value as to enable the heating element 12 to heat the fluid within the container 10 to its desired maximum temperature prior to the cut-off which is 6 A. M. in this instance. It will be understood that my present invention may, however, be employed in electrical systems of either the off-peak variety, using such a cut-off point governed by a time-controlled mechanism such as motor 36, or may be employed in an electrical system not having any such cut-off.

Likewise, it is to be understood that the thermostat 14 will disengage the heater 12 from the power supply when the water has reached its desired maximum temperature value, even though the contacts 24 and 28 are engaged in accordance with well known practice. Accordingly, it is obvious that the cam 40 in cooperation with contacts 28 and 24 functions as a special control device which permits the heating element to be energized during predetermined periods of the day for the purpose set forth.

Various modifications may be made in the device embodying my invention without departing from the spirit and scope thereof, and I desire, therefore, that only such limitations shall be placed thereon as are imposed by the prior art and the appended claims.

I claim as my invention:

1. In a fluid-heating system, the combination with a container for the fluid, and controllable means for imparting heat to the fluid, of first contact means movable in response to the usage of the fluid, and second contact means movable in response to the passage of time, said first and second contact means coacting with each other for rendering the heat-imparting means effective at times.

2. In a fluid-heating system, the combination with a container for the fluid, and controllable means for imparting heat to the fluid, of first means responsive to the usage of the fluid, and second means responsive to the passage of time for rendering said heat-imparting means ineffective for a predetermined period at a preselected time of day, said first and second means coacting with each other for rendering the heat-imparting means effective at a time preceding said preselected time to raise the temperature of the fluid to a predetermined value at said preselected time.

3. In a fluid-heating system, the combination with a container for the fluid, and controllable means for imparting heat to the fluid, of first means responsive to the usage of the fluid, a movable contact adapted to move in response to the movements of the first means, second means responsive to the passage of time, a second contact adapted to move in response to the movements of the second means and to cooperate with the first contact for rendering the heat-imparting means effective at a predetermined time so as to raise the temperature of the fluid to a predetermined value prior to a preselected cut-off time.

4. In a fluid-heating system, the combination with a container for the fluid, and controllable means for imparting heat to the fluid, of first means responsive to the usage of the fluid, a movable contact adapted to move in response to the movements of the first means, cam means adapted to rotate in response to the passage of time, a second contact adapted to cooperate with the cam for rendering said heat-imparting means ineffective for a predetermined period at a preselected time of day and to cooperate with the first contact for rendering the heat-imparting means effective at a time preceding said preselected time to raise the temperature of the fluid to a predetermined value at said preselected time.

5. In a fluid-heating system, the combination with a container for the fluid adapted to have the fluid pass therethrough and controllable means for imparting heat to the fluid, of impeller means associated with the container adapted to rotate in response to the passage of fluid through the container, first contact means associated with the impeller means and responsive to the rotation thereof, and second contact means responsive to the passage of time, said first and second contact means coacting with each other for rendering the heat-imparting means effective at times.

6. In a fluid-heating system, the combination with a container for the fluid, and controllable means for imparting heat to the fluid, of first contact means movable in response to the usage of the fluid, a cam, means for rotating such cam at a constant speed, and second contact means adapted to be moved into an operative position by said cam, said first and second contact means coacting with each other for rendering the heat-imparting means effective at times.

7. In a fluid-heating system, the combination with a container for the fluid adapted to have the fluid pass therethrough and controllable means for imparting heat to the fluid, of impeller means associated with the container adapted to rotate in response to the passage of fluid through the container, first contact means associated with the impeller means and responsive to the rotation thereof, a cam, means for rotating such cam at a constant speed, and second contact means adapted to be moved into an operative position by said cam, said first and second contact means coacting with each other for rendering the heat-imparting means effective at times.

JOS. H. REIFENBERG.